Feb. 5, 1946.   I. L. EASTMAN   2,394,236
COUPLING
Filed Nov. 15, 1943

INVENTOR.
Ivan L. Eastman
BY
W. P. Carr
ATTORNEY.

Patented Feb. 5, 1946

2,394,236

UNITED STATES PATENT OFFICE 2,394,236

COUPLING

Ivan L. Eastman, Sylvania, Ohio, assignor to The De Vilbiss Company, Toledo, Ohio, a corporation of Ohio Application November 15, 1943, Serial No. 510,406

3 Claims. (Cl. 285—168)

This invention relates to a coupling for use primarily in joining together two sections of hose or a tool and a hose.

An object of the invention is to provide a coupling which may be quickly engaged or disengaged.

Another object is to provide a coupling which has a leak-proof connection when engaged and includes a valve which effectively prevents loss of fluid through the supply member of the coupling when disengaged.

A further object of the invention is to provide a coupling in which the coupling elements are protected from injury and dirt by being located on the interior of the coupling.

The invention possesses other objects which will be apparent through a reading of the following description of the preferred embodiment illustrated in the accompanying drawing in which.

Figure 1:
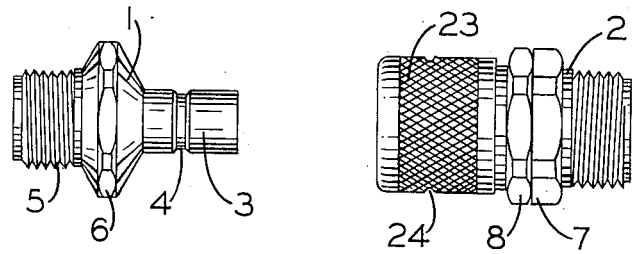
Figure 1 is a side elevational view of the coupling with the members in separated position.
Figure 2:
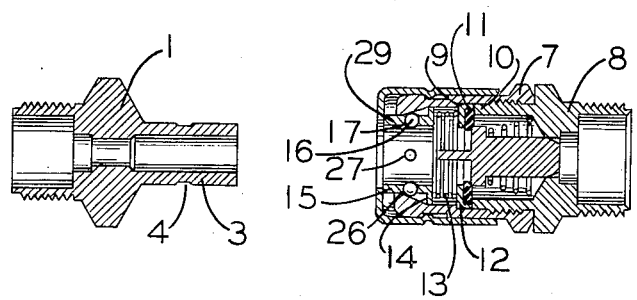
Figure 2 is a longitudinal section of the two members illustrated in Figure 1.

With reference to the drawing, the coupling therein depicted comprises a male piece 1 and a female assembly 2. The former has a nipple section 3 with an annular groove 4 for reception of locking or retaining members within the assembly 2. On the other end of the male piece is a threaded portion 5 for connecting it to a tubing or hose. The hexagon surface 6 is provided for the use of a wrench in making such a connection.

The female assembly has a main body member 7 to which is fastened a tubular extension 8. The latter has a shoulder 9 between which and the end 10 of the body 7 are held valve seat 11 and washer 12. A spring 13 is compressed between the washer 12 and a flange 14 on ball cage 15. Locking balls 16 are located in four ports 17 equidistantly spaced around the cage.

The valve 18 is normally held against valve seat 12 by spring 19. The valve has a flat tail section 20 which has guiding contact with the passage 21 in the body 7. On the other side of the valve is a short tongue 22 which is engaged to move the valve from its seat by the end of nipple 3 of the male piece 1 as the coupling is assembled into attached position.

The releasing sleeve 23 is loosely mounted upon the extension 8 where it is held in assembled relation by punch indentations 24 extending into the channel 25 circumscribing extension 8. This channel is sufficiently wider than the punch indentations to permit the sleeve some reciprocable movement relative to the extension 8. The exterior openings 26 of the ports 17 are large enough to receive balls 16 while the inner openings 27 are slightly smaller than the diameter of the balls, permitting them to extend partly through and into the groove 4 when the coupling is in attached position, but preventing the balls from dropping through the holes when the coupling members are disconnected.

The sleeve 23 has an inwardly depending flange 28 which may be moved against the protruding end 29 of the ball cage 15. When the coupling is in either completely attached or entirely disengaged position, the ball cage 15 is thrust slightly outwardly from the end of the assembly by the spring 13 with the balls against the outer and narrower end of the tapered section 30 of the extension 8.

Figure 3:
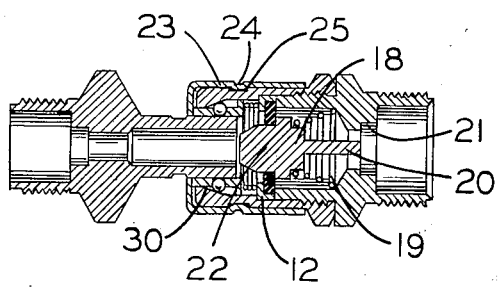
Figure 3 is a longitudinal section of the two members in partially coupled relation.
Figure 4:
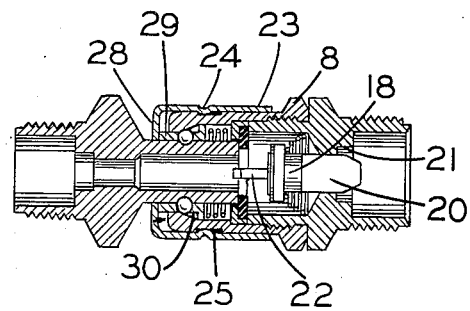
Figure 4 is a similar view showing the parts fully coupled.
Figure 5:
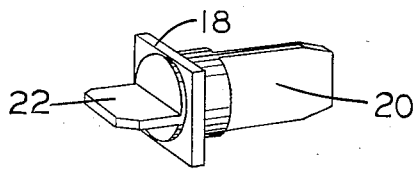
Figure 5 is an enlarged perspective view of the valve forming a part of the coupling.

When it is desired to fasten the parts of the coupling together, the nipple 3 of the male piece 1 is inserted into assembly 2. The end of the nipple first strikes the portions of the balls 16, extending inwardly through the walls of the cage 15, thereby moving the cage against spring 13 and the balls away from the narrower portion of the tapered section 30 of the extension 8. As shown in Figure 3 the balls will move back through the ports 17 as soon as there is sufficient room for them on the other side of the cage. This permits the nipple 3 to move past the ports 17 into opening contact with the valve 18. The thrust of spring 13 against the flange 14 of the cage 15 still presses the balls against the wider section of the tapered surface 30 which tends to push them through the ports. Accordingly the balls enter the annular groove 4 as soon as it arrives beneath the ports. At the same time the end of nipple 3 meets valve seat 12 and establishes a seal between the two parts of the coupling. The dropping of the balls into groove 4 is accomplished by a movement of the cage 15 outwardly under the propulsion of the spring 22 and the end 29 of the cage 15 will again extend beyond the end of the extension 8. The coupling is now locked in closed position as shown in Figure 4.

With the locking balls acting like ball bearings and the ball cage rotatable, one part of the coupling may be freely turned while the other remains stationary. This is a decided advantage when the coupling is used between a hose and a hand tool as there is considerably less work in manipulating such a tool if the hose does not turn with it. Also this arrangement extends the life of the hose, as the twisting of the hose that is eliminated tends to weaken the individual fabric strands and their adhesion to the adjoining rubber compound.

Pulling on the outer ends of the coupling does not open the connection as the balls resist any uncoupling movement by being wedged between the tapered section 30 and the inner shoulder of groove 4. This lock is broken by a backward pull on releasing sleeve 23 while simultaneously bringing the two parts of the coupling a slight amount closer together. This releases the balls from their wedged position and through movement with the cage forces them out of the groove. It may be seen therefore that the hand holding the female assembly may pull back the releasing sleeve and as a continuation of the same movement pull the assembly away from the male connection. The uncoupling action is thereby a simple and rapid operation.

While one form only of my invention has been shown and described in detail, it will be understood that the other embodiments are possible and various changes may be made in the arrangement of parts without departing from the spirit of the invention as defined in the claims appended hereto.

What I claim as my invention is:

1. A coupling comprising a male member, a connecting nipple portion thereon with a peripheral groove, a female member, a plurality of balls within the female member engaging and having rolling contact with said groove, an inner cage rotatable and axially reciprocable in respect to the female member in which the balls are loosely mounted, an end of the cage extending exteriorly of the female member, a sleeve rotatably and slidably mounted on the exterior of the female member, and a flange on the sleeve projecting radially inwardly over the end of the female member in contacting relation with the exteriorly extending end of the cage, whereby the balls may be moved out of the groove by manually moving the sleeve against the extending end of the cage and thus forcing the cage inwardly.

2. In a coupling of the type described a male member and a female assembly, a cylindrical bore within the assembly terminating at its inner end with a shoulder and with a narrowing taper at its outer end, a nipple on the male member for insertion into the bore, a peripheral groove on the nipple, a rotatable and reciprocable tubular cage within the bore telescoping over the nipple, radially movable locking balls loosely carried by the cage, a laterally flaring flange on the inner end of the tubular cage, a spring within the bore, compressed between the shoulder at the inner end of the bore and the flange on the inner end of the cage, the thrust of the spring forcing the cage outwardly and impelling the balls carried by the cage against the narrowing taper and thus radially inwardly into the groove to lock the male member and female assembly in coupled relation, a sleeve rotatably and slidably mounted on the exterior of the female member, and a flange on the sleeve projecting radially inwardly over the end of the female member in contacting relation with the outer end of the cage, whereby the locking balls may be forced out of the groove by manually moving the sleeve against the outer end of the cage and thus forcing the cage inwardly.

3. A coupling comprising a male member, a connecting nipple portion thereon with a peripheral groove, a female member, a cylindrical bore within the female member terminating at its outer end with a narrowing taper, said taper being in surrounding relation to the peripheral groove on the male member nipple, a tubular cage rotatably and reciprocably supported within the female member and telescoped between it and the male nipple, a plurality of bearing and locking balls loosely and circumferentially carried by the tubular cage, a spring mounted within the bore and thrust against the inner end of the cage to urge the cage outwardly and to hold the balls between the groove in the nipple and the narrowing tapered end of the cylindrical bore, whereby the balls utilize opposing surfaces of the groove and the taper to hold the two members of the coupling axially together and also utilize such surfaces as a bearing runway when the two members are relatively rotated and the balls roll between them.

IVAN L. EASTMAN.